United States Patent [19]

Kotani et al.

[11] Patent Number: 5,414,030

[45] Date of Patent: * May 9, 1995

[54] AGRICULTURAL FILM

[75] Inventors: Kozo Kotani, Toyonaka; Taiichi Sakaya, Takatsuki, both of Japan

[73] Assignee: Sumitomo Chemical Company, Limited, Osaka, Japan

[ * ] Notice: The portion of the term of this patent subsequent to Nov. 16, 2010 has been disclaimed.

[21] Appl. No.: 994,998

[22] Filed: Dec. 22, 1992

[30] Foreign Application Priority Data

Dec. 24, 1991 [JP] Japan .................................. 3-340820

[51] Int. Cl.⁶ .................................................. C08K 5/34
[52] U.S. Cl. .......................................... 524/99; 524/414
[58] Field of Search ................................ 524/99, 414

[56] References Cited

U.S. PATENT DOCUMENTS

| 4,490,502 | 12/1984 | Fukushima et al. | 524/445 |
| 5,262,459 | 11/1993 | Kotani et al. | 524/91 |

FOREIGN PATENT DOCUMENTS

| 0030288 | 6/1981 | European Pat. Off. . |
| 0389640 | 10/1990 | European Pat. Off. . |
| 0448096 | 9/1992 | European Pat. Off. . |
| 0516131 | 12/1992 | European Pat. Off. . |
| 2569707 | 3/1986 | France . |
| 2604441 | 4/1988 | France . |
| 5825 | 2/1982 | Japan . |
| 86645 | 8/1984 | Japan . |
| 62-5182 | 2/1987 | Japan . |
| 41240 | 2/1987 | Japan . |
| 167350 | 6/1990 | Japan . |
| 2093042 | 8/1982 | United Kingdom . |
| 8403296 | 8/1984 | WIPO . |

Primary Examiner—Joseph L. Schofer
Assistant Examiner—P. Mulcahy
Attorney, Agent, or Firm—Birch, Stewart, Kolasch & Birch

[57] ABSTRACT

Disclosed is an agricultural film produced by forming into a film a composition comprising (a) a polyolefin resin, (b) a dripping agent, (c) a heat stabilizer and (d) a weather resistance improving agent and (e) a solution of a hypophosphite compound in an organic solvent.

20 Claims, No Drawings

AGRICULTURAL FILM

FIELD OF THE INVENTION

This invention relates to an agricultural film excellent in heat stability and weather resistance.

PRIOR ART

The agricultural covering films currently used for horticultural cultivation houses, tunnels or the like are mostly polyvinyl chloride films and polyolefin resin films such as polyethylene films and ethylene-vinyl acetate copolymer films. These films, commonly known as agricultural PVC films, agricultural PE films, agricultural EVA films or the like, are widely used for such horticultural purposes.

The purposes of such greenhouse or tunnel in agriculture and horticulture are to artificially adjust or control the cultivation environment to thereby create an environment suitable for farm products, to enable cultivation of crops during the period wherein raising them outdoors is practically impossible or to increase the productivity thereof during the period wherein said productivity is low. Therefore it is necessary to know the correlation between various environmental factors (e.g. light, temperature, humidity, carbon dioxide concentration, water, soil) and the growing behaviors of crops and creating a suitable production environment while taking the economic features into consideration as well.

The performance characteristics required of the covering materials essential to the formation of artificial spaces, namely such facilities as greenhouses and cultivation tunnels, may differ depending on the purpose of their application and further on the target vegetable species or the like product species.

Main performance characteristics required of the covering materials, inclusive of primary covering materials, heat insulating curtains and the like, for such houses and tunnels are weather resistance (ability to endure the sunny outdoor use conditions for a long period), dripping property (ability to inhibit the phenomenon of the transparency being decreased due to the deposit, over the covering film inside surface, of minute water drops resulting from dew condensation because of high humidity conditions in the house or tunnel), heat retention property (ability to maintain high temperature levels in greenhouses at night) and high light transmittance (transparency), among others. The term "dripping" as used in this specification means that water drops formed by condensation on the film surface are caused to flow down without staying on said surface.

In particular, a recent important requirement is that the covering materials have a longer service life for the reasons that a large number of persons of advanced age are now engaged in agriculture and that laborsaving is essential. Thus, a weather resistance improving technology is earnestly required.

In view of the recent public opinion on the earth environment problem, more attention is now given on polyolefin-base covering films which are readily and completely combustible without any fear of toxic gas evolution, than on polyvinyl chloride films (agricultural PVC films) which generate gaseous hydrochloric acid upon disposal by incineration.

As for the weather resistance improving technology for polyolefin resins, Japanese Unexamined Patent Publication (Kokai) No. 86645/1984, for instance, discloses a method which comprises using hindered amine compounds as weather resistance improving agents and, further, Japanese Unexamined Patent Publication (Kokai) No. 167350/1990 discloses a method which comprises using a hindered amine compound, a heat stabilizer and a hypophosphite compound to thereby attain a high level of weather resistance.

As for the dripping property improving technology for polyolefin resin-based covering films, Japanese Unexamined Patent Publication (Kokai) No. 41240/1987, for instance, discloses a method which comprises using nonionic surfactants as dripping agents.

As for the heat retention or insulation improving technology for polyolefin resin-based covering films, Japanese Examined Patent Publications (Kokoku) No. 5825/1982 and No. 5182/1987, for instance, disclose the use of various inorganic compounds for heat retention.

In producing these polyolefin resin-based covering films, heat stabilizers (hindered phenol heat stabilizers, sulfur-containing heat stabilizers, phosphite ester heat stabilizers, etc.) are generally added for providing processing stability and heat stability.

Thus, as a result of successful combination of the above-mentioned and other kinds of technology, agricultural polyolefin films are now comparable in performance characteristics to agricultural PVC films and are superior to the latter from the disposability viewpoint.

However, such prior art techniques as mentioned above are not fully satisfactory, so far as the weather resistance problem is concerned. This is due to the fact that agricultural films are used in particularly sunny outdoor places, that the portions thereof which are in contact with the metallic frames of cultivation houses or tunnels are exposed to considerably high temperature conditions, and that the film thickness is very small. Addition of weather resistance improving agents in increased amounts can of course lead to somewhat more improved weather resistance but, on the other hand, may disadvantageously cause yellowing of films or bleeding of the weather resistance improving agents to thereby impair the appearance of films. Furthermore, the method disclosed in Japanese Unexamined Patent Publication (Kokai) No. 167350/1990, which uses a hindered amine compound, a heat stabilizer and a hypophosphite compound, provides agricultural films with excellent heat stability and weather resistance but still has a problem that, when the agricultural films are used under high-humidity conditions, the hypophosphite compound tends to absorb moisture to thereby cause whitening of the films.

SUMMARY OF THE INVENTION

Accordingly, it is an object of the invention to provide an agricultural film based on an ecologically advantageous polyolefin resin and having particularly good heat stability and weather resistance.

We made intensive investigations in an attempt to improve the weather resistance of agricultural films, in particular polyolefin resin-based agricultural films. As a result, we found that an agricultural film obtained by forming into a film a composition comprising a polyolefin resin, a dripping agent, a heat stabilizer, a weather resistance improving agent and, in addition, a solution of a hypophosphite compound in an organic solvent is excellent particularly in heat stability and weather resistance and, at the same time, resistant to film whitening even under high-humidity conditions. The present invention has been completed based on these findings.

Thus the invention provides an agricultural film produced by forming into a film a composition comprising (a) a polyolefin resin, (b) a dripping agent, (c) a heat stabilizer, (d) a weather resistance improving agent, and (e) a solution of a hypophosphite compound in an organic solvent.

DETAILED DESCRIPTION OF THE INVENTION

In the following, the present invention is described in detail.

The polyolefin resin (a) which constitutes the agricultural film of this invention is one conventionally used in the art, such as an α-olefin homopolymer or a copolymer of an α-olefin as the main component and one or more comonomers. Useful polyolefin resin includes, among others, polyethylene, polypropylene, ethylene-α-olefin copolymers such as ethylene-propylene copolymers, ethylene-butene-1 copolymers, ethylene-4-methylpentene-1 copolymers and ethylene-hexene-1 copolymers, ethylene-vinyl acetate copolymers, ethylene-acrylic acid copolymers, ethylene-methyl methacrylate copolymers, ethylene-vinyl acetate-methyl methacrylate copolymers and ionomer resins.

These resins preferably have a melt flow index of not less than 0.3 g/10 minutes but not more than 4 g/10 minutes, preferably 0.3 g/10 minutes to 2 g/10 minutes. When the melt flow index is less than 0.3 g/10 minutes, film processing will become difficult. When said index exceeds 4 g/10 minutes, the film strength tends to decrease.

Among the resins mentioned above, low-density polyethylene or ethylene-α-olefin copolymers having a density of not more than 0.935 g/cm$^3$, preferably about 0.910 to 0.935 g/cm$^3$, and ethylene-vinyl acetate copolymers having a vinyl acetate content of not more than 30% by weight are preferred because of their excellent transparency and flexibility and because of inexpensiveness of the product films.

As the dripping agent (b) in accordance with the invention, a dripping agent which is conventionally employed is used to provide the product film with dripping property.

As examples of the dripping agent that can be used in the practice of the invention, nonionic surfactants, among others, are preferred.

In selecting the dripping agent, not only the ability to maintain excellent dripping property but also such factors as film-forming ability, heat stability, transparency (or film whitening due to the bleeding of the dripping agent) and appropriate compatibility with the polyolefin resin employed should be taken into consideration.

Among nonionic surfactants, preferred are those containing, as the hydrophilic moiety, a polyhydric alcohol, such as sorbitan, sorbitol, glycerol, diglycerol, triglycerol, tetraglycerol, polyglycerol, polyethylene oxide, polypropylene oxide or other polyalkylene oxide, and, as the hydrophobic moiety, a hydrocarbon chain of 8 to 22 carbon atoms. As typical examples, there may be mentioned sorbitan fatty acid ester surfactants, particularly $C_8$–$C_{22}$ fatty acid esters of sorbitan such as sorbitan monostearate, sorbitan monopalmitate and sorbitan monobehenate; glycerol fatty acid ester surfactants, particularly mono-, di-, tri- or tetra-$C_8$–$C_{22}$ fatty acid esters of glycerol, diglycerol or triglycerol such as glycerol monolaurate, glycerol monopalmitate, glycerol monostearate, diglycerol distearate and triglycerol monostearate; polyalkylene glycol fatty acid ester surfactants, particularly those prepared by adding 1 to 10 moles of $C_2$–$C_3$ alkylene oxide to a $C_8$–$C_{22}$ fatty acid such as polyethylene glycol monopalmitate and polyethylene glycol monostearate; alkylphenol-alkylene oxide adducts, particularly those prepared by adding 1 to 10 moles of $C_2$–$C_3$ alkylene oxide to a $C_8$–$C_{22}$ alkyl-substituted phenol such as polyoxyethylene octylphenyl ether, polyoxyethylene nonylphenyl ether, and organic acid esters of sorbitan-glycerol condensates, particularly those wherein the organic acid moiety is derived from a fatty acid containing 8 to 22 carbon atoms.

The dripping agent is used in an amount of about 0.5 to 5 parts by weight, preferably about 1.5 to 3 parts by weight, per 100 parts by weight of the polyolefin resin. When the amount of the dripping agent is below 0.5 part by weight, the dripping property will not last long. When said amount exceeds 5 parts by weight, increased migration of the dripping agent to the film surface tends to occur, impairing the transparency (causing film whitening due to the bleeding of the dripping agent) and allowing increased blocking. In order to optimize the total dripping property, i.e., the initial dripping property, duration of dripping effect, dripping property in the cold season and dripping property in the warm season, it is generally preferable to use two or more dripping agents in combination.

The heat stabilizer (c) to be used in accordance with the invention includes, among others, hindered phenol compounds, such as 2,6-dialkylphenol derivatives and 2-alkylphenol derivatives, sulfur compounds having one or more (particularly 1 to 4) thiol or thioether bonds each comprising a bivalent sulfur atom, and phosphite ester compounds containing one or more (particularly 1 to 3) trivalent phosphorus atoms.

As examples of the hindered phenol heat stabilizer, there may be mentioned compounds of the following formulas (1) to (8).

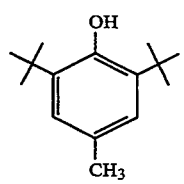

(1)

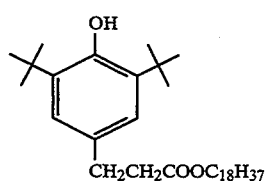

(2)

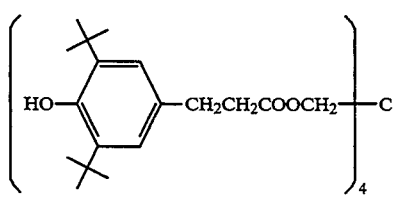

(3)

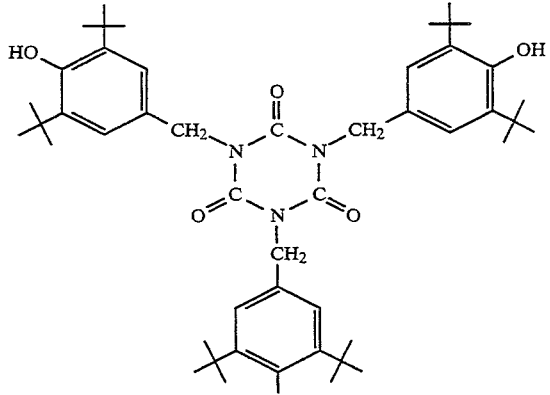
(4)
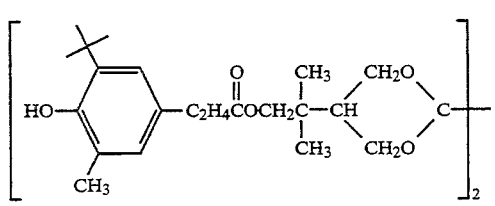
(5)
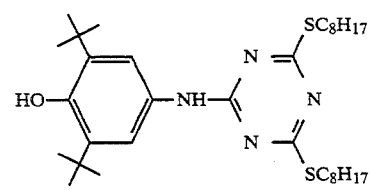
(6)
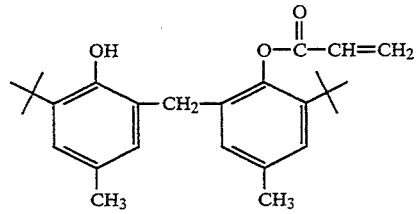
(7)
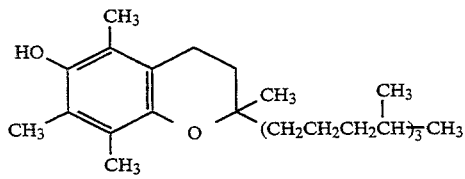
(8)
As examples of the sulfur compound heat stabilizer, there may be mentioned compounds of the following formulas (9) to (16).
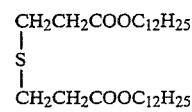
(9)
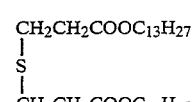
(10)
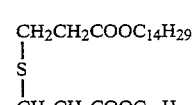
(11)
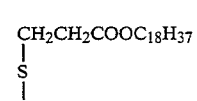
(12)
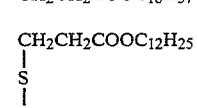
(13)
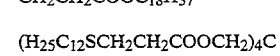
$(H_{25}C_{12}SCH_2CH_2COOCH_2)_4C$ (14)
(15)
(R being an alkyl group of 12 to 14 carbon atoms)
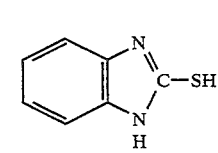
(16)
As examples of the phosphite ester heat stabilizer, there may be mentioned compounds of the following formulas (17) to (33).
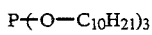
$P(O-C_{10}H_{21})_3$ (17)
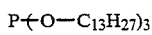
$P(O-C_{13}H_{27})_3$ (18)
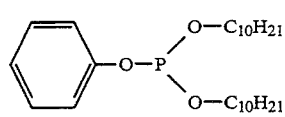
(19)
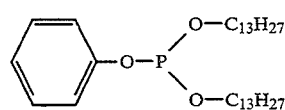
(20)

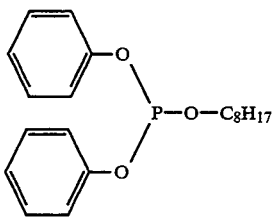
(21)
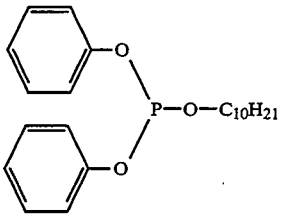
(22)
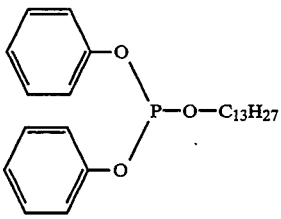
(23)
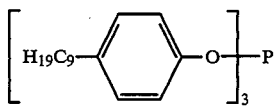
(24)
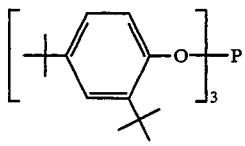
(25)
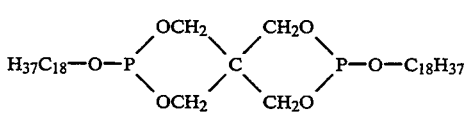
(26)
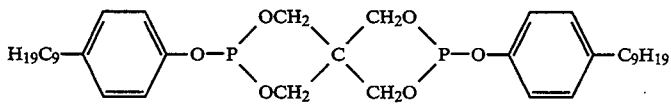
(27)
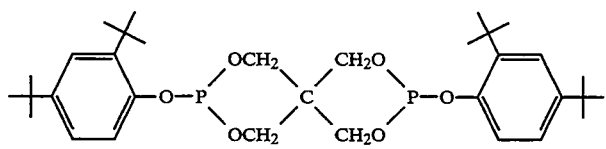
(28)
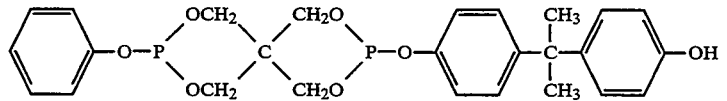
(29)
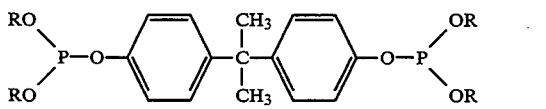
(30)
(R being an alkyl group of 12 to 15 carbon atoms)

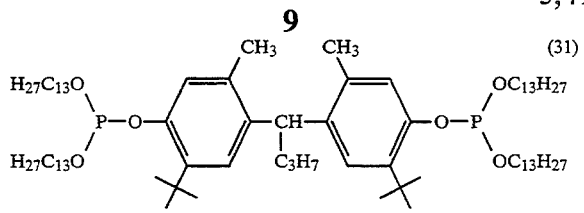
(31)

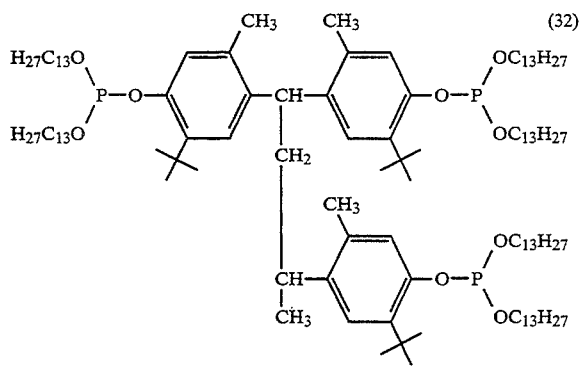
(32)

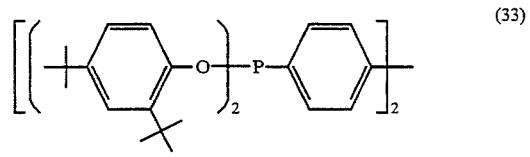
(33)

The heat stabilizers of the above formulas (1) through (33) are all known compounds and readily available on the market.

These heat stabilizers may be used either singly or in combination.

The heat stabilizer is used generally in an amount of about 0.01 to 1 part by weight, preferably about 0.05 to 0.5 part by weight, per 100 parts by weight of the polyolefin resin. When the amount is below 0.01 part by weight, the heat stability improving effect will be poor while the use thereof in an amount exceeding 1 part by weight may unfavorably cause bleeding or discoloration of the heat stabilizer.

As the weather resistance improving agent (d) according to the invention, there may be mentioned a hindered amine compound and an ultraviolet absorber, which are conventionally used.

The hindered amine compound to be used as the weather resistance improving agent is a 4-substituted 2,2,6,6-tetraalkylpiperidine derivative having a molecular weight of not less than 250, preferably 250 to 10,000.

The substituent in position 4 includes for example, a carboxylic acid residue, an alkoxy group, an alkylamino group or any of other various groups. The N-position of the 4-substituted 2, 2, 6, 6-tetraalkylpiperidine derivative may be substituted by an alkyl group, particularly a $C_1$-$C_4$ alkyl group, or the like. As typical examples, there may be mentioned compounds of the following formulas (34) to (41).

(34)

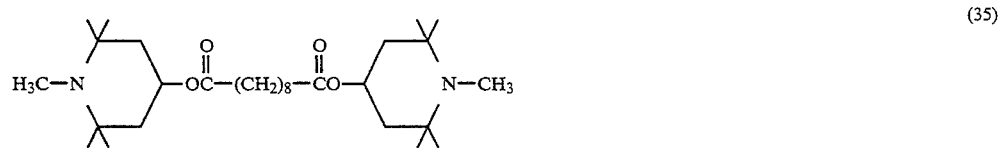
(35)

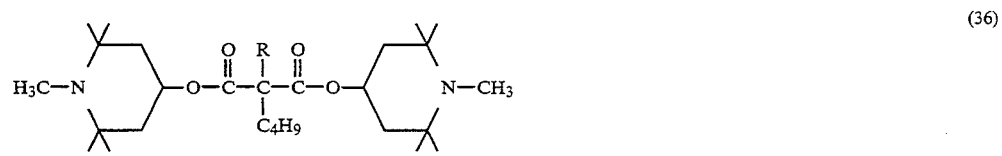
(36)

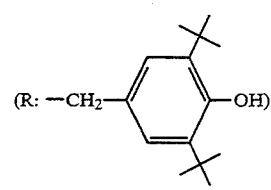

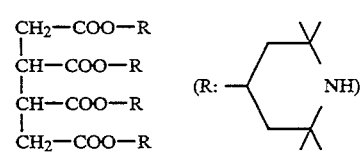
(37)

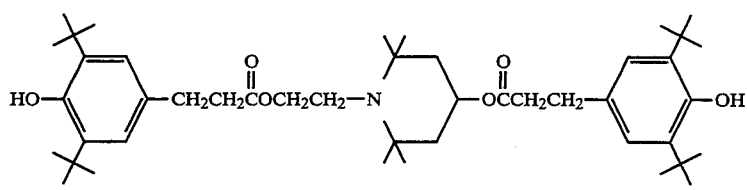 (38)

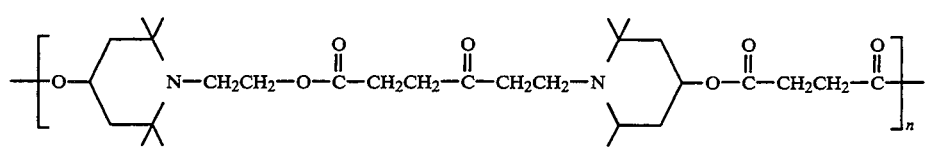 (39)

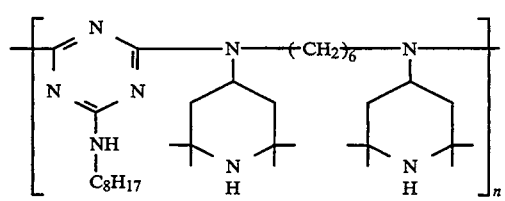 (40)

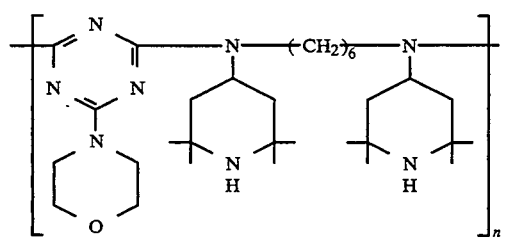 (41)

In the formulas (39)–(41), n is an integer of 4 to 7.

The ultraviolet absorber to be used as the weather resistance improving agent in the practice of the invention includes benzophenone ultraviolet absorbers, benzotriazole ultraviolet absorbers, benzoate ultraviolet absorbers and cyanoacrylate ultraviolet absorbers. As typical examples, there may be mentioned compounds of the following formulas (42) to (50).

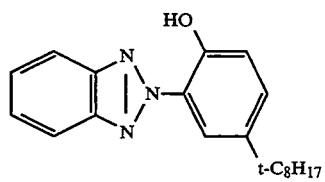 (42)

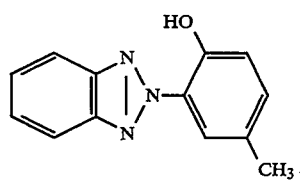 (43)

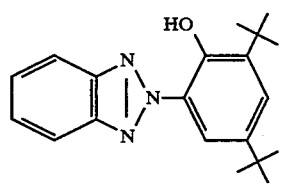 (44)

-continued

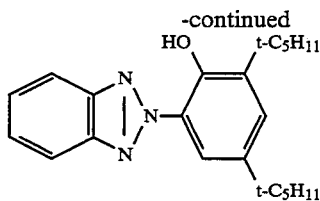 (45)

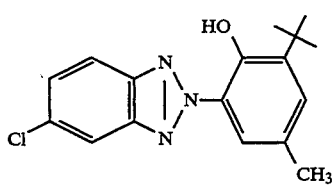 (46)

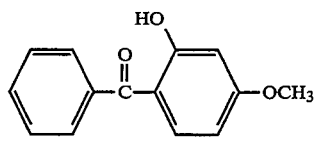 (47)

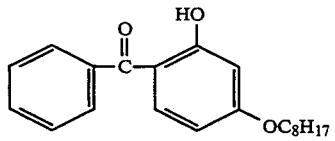 (48)

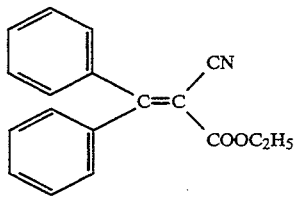
(49)

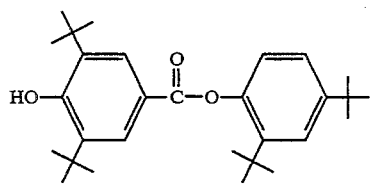
(50)

The compounds of the above formulas (34) to (50) are all known compounds and readily available on the market.

The weather resistance improving agent selected from among the foregoing hindered amine compounds and ultraviolet absorbers is used generally in an amount of about 0.01 to 3 parts by weight, preferably about 0.05 to 1 part by weight, per 100 parts by weight of the polyolefin resin. When the amount is less than 0.01 part by weight, the weather resistance improving effect tends to be poor while the use thereof in an amount exceeding 3 parts by weight may unfavorably result in bleeding of the ultraviolet absorber.

Such weather resistance improving agents as mentioned above may be used either singly or in combination.

In the present invention, a solution (e) of a hypophosphite compound in an organic solvent is used.

The hypophosphite compound to be used in accordance with the invention is represented by the general formula $$X_a(H_2PO_2)_b \qquad (A)$$

wherein X is a metal ion, ammonium ion or quaternary phosphonium ion, a and b each is a natural number and a multiplied by c being equal to b, wherein c is the valence of X.

Typical examples of the hypophosphite compound are lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophosphite, triethylammonium hypophosphite, tetraethylammonium hypophosphite, tetrabutylphosphonium hypophosphite and tetraphenylphosphonium hypophosphite. The hypophosphite compounds specifically mentioned above are known compounds or can readily be synthesized from commercially available corresponding salts by a conventional method.

Such hypophosphite compounds as specifically mentioned above may be used either singly or in combination.

The organic solvent to be used for dissolving the hypophosphite compound is preferably an organic solvent which can dissolve the hypophosphite compound and which has a boiling point of not lower than the resin processing temperature for film forming. As typical examples, there may be mentioned protic polar solvents, such as polyhydric alcohols and polyamines, and aprotic polar solvents, such as alkyl sulfoxides. Preferred protic polar solvents are ethylene glycol, diethylene glycol, polyethylene glycol (molecular weight: about 150 to 50,000), propylene glycol, polypropylene glycol (molecular weight: about 134 to 50,000), glycerol, diglycerol, hexaglycerol, trimethylolpropane, hexamethylenediamine and the like. Dimethyl sulfoxide and the like are preferred aprotic polar solvents. These may be used either alone or in combination.

The hypophosphite compound is used generally in an amount of about 0.01 to 2 parts by weight per 100 parts by weight of the polyolefin resin. If the amount is less than 0.01 part by weight, the heat stability and weather resistance improving effects may not be sufficiently improved. If the amount exceeds 2 parts by weight, the transparency may occasionally be impaired.

The amount of the organic solvent for dissolving the hypophosphite compound is preferably such that a solution containing the hypophosphite compound in said organic solvent at a concentration not higher than the saturation concentration is used in an amount of about 0.01 to 5 parts by weight per 100 parts by weight of the polyolefin resin. The hypophosphite compound concentration in the solution containing the hypophosphite compound is preferably about 0.1% to about 80%, more preferably about 1% to about 50% by weight, but in any event is not higher than the saturation concentration. At any rate, it is important that the hypophosphite compound is used as dissolved in said organic solvent, namely in the form of a solution containing the hypophosphite compound in said organic solvent at a concentration not higher than the saturation concentration, and that the amount of the hypophosphite compound is about 0.01 to 2 parts by weight per 100 parts by weight of the polyolefin resin.

For improving the heat retention at night in cultivation houses or tunnels, the agricultural film of this invention may further contain an inorganic compound for heat retention, if so desired. Said inorganic compound includes, among others, oxides, hydroxides, carbonates, sulfates, phosphates, silicates, aluminates, aluminosilicates and the like of such metals as lithium, sodium, potassium, magnesium, calcium, zinc, aluminum, silicon and titanium. These may be used either alone or in combination.

Among such inorganic compounds, magnesium oxide, calcium oxide, aluminum oxide, silicon oxide, titanium oxide and the like may be mentioned as the oxides; lithium hydroxide, magnesium hydroxide, calcium hydroxide, aluminum hydroxide and the like as the hydroxides; magnesium carbonate, calcium carbonate and the like as the carbonates; potassium sulfate, magnesium sulfate, calcium sulfate, zinc sulfate, aluminum sulfate and the like as the sulfates; lithium phosphate, sodium phosphate, potassium phosphate, calcium phosphate and the like as the phosphates; magnesium silicate, calcium silicate, aluminum silicate, titanium silicate and the like as the silicates; sodium aluminate, potassium aluminate, calcium aluminate and the like as the aluminates; and sodium aluminosilicate, potassium aluminosilicate, calcium aluminosilicate and the like as the aluminosilicates. Mention may further be made of basic double salts, typically hydrotalcite, as double salts composed of those inorganic compounds mentioned above.

Among the inorganic compounds specifically mentioned above, silicon oxide, calcium phosphate, aluminum silicate, hydrotalcite and the like are preferred since, when incorporated in synthetic resins, they provide the resins with good heat-retaining property without impairing the transparency thereof.

The inorganic compound is used in the form of a powder. The smaller the particle size of the powder is, the more uniform the dispersion attainable is. From the strength and transparency viewpoints, an average particle size of about 0.5 to 10 $\mu$m is preferred.

When such an inorganic compound is used, said inorganic compound is used in an amount of not more than 20 parts by weight, preferably about 0.5 to 20 parts by weight, more preferably about 1 to 15 parts by weight, per 100 parts by weight of the polyolefin resin. If the amount is below 0.5 part by weight, the heat retention improving effect will not be sufficient. Conversely, the use thereof in an amount exceeding 20 parts by weight tends to impair the film strength and/or transparency.

If desired, the agricultural film of this invention may further contain a conventional antifogging agent, lubricant, pigment and like additives.

The agricultural film of the invention is produced in the following manner. The polyolefin resin is admixed and kneaded with a dripping agent, a solution of hypophosphite compound in an organic solvent, a heat stabilizer and a weather resistance improving agent, optionally together with various other additives, such as the inorganic compound mentioned above, each in an appropriate amount, in a conventional mixing and/or kneading device such as a ribbon blender, supermixer, Banbury mixer or single-screw or twin-screw extruder. The subsequent film production can be conducted in the conventional manner, for example by using the calendering, T die extrusion, or inflation technique. It is also possible to produce a two-layer film composed of two different compositions or a three-layer film composed of two or three different compositions using the T die extrusion or inflation technique. A three-layer film, wherein its middle layer is composed of a resin composition containing an inorganic compound, will advantageously have a much improved level of transparency.

The agricultural film of the invention generally has a thickness of about 0.02 to 0.3 mm, preferably about 0.03 to 0.2 mm. When the film thickness is less than 0.02 mm, the film strength will tend to be insufficient. Conversely, a thickness exceeding 0.3 mm is less desirable since such works as film seaming and application as covering material often becomes difficult to perform.

The agricultural film provided by the present invention is almost free from whitening due to absorption of moisture, even when used under high humidity conditions in the field of agriculture as a covering of a cultivation house or tunnel. Said film shows very good heat stability in the production process and very good weather resistance when used as a covering film. Thus it can be used as a material useful in horticulture.

The following examples illustrate the invention in further detail. However, they are by no means limitative of the scope of the invention. The test methods used in the examples are as follows.

Water immersion test

Square test specimens (10 cm $\times$ 10 cm) cut from each film sample were immersed in water at 23° C. for 24 hours and the extent of film whitening was evaluated according to the following criteria:

A: Little whitening
C: Whitening

Heat stability test

Test specimens (3 cm $\times$ 3 cm, 1 mm in thickness) were allowed to stand in air at 190° C. and the change in color was evaluated according to the following criteria:
A: Little discoloration
B: Slight yellowing
C: Yellowing or browning Weathering test Dumbbell-shaped test specimens (prepared by punching with a JIS No. 1 dumbbell die) were allowed to age in Eye Super UV Tester (trademark; manufactured by Eye Graphics Co., Ltd.; model SUV-W11 modified) under the following conditions: luminous energy 100 mW/cm$^2$, distance from light source 24 cm, temperature of blowing air 60° C., relative humidity 33%.

The aged test specimens were subjected to tensile test using Autograph DSS100 (trademark; manufactured by Shimadzu Corp.) for determining elongation (%) and the weathering test period after which the elongation was half the initial value (hereinafter referred to as "weathering half-life") was determined for each sample. The longer this half-life is, the better the weather resistance is.

EXAMPLE 1

To 100 parts by weight of an ethylene-vinyl acetate copolymer (trademark: Evatate D2011; vinyl acetate content 5% by weight; melt flow index (MI)=2.0 g/10 minutes; manufactured by Sumitomo Chemical Company, Limited), which was employed as a polyolefin resin, were added 1.4 parts by weight of monoglycerol monostearate and 0.6 part by weight of diglycerol distearate (each as a dripping agent), 4 parts by weight of aluminum silicate (trademark: Silton AMT; manufactured by Mizusawa Industrial Chemicals Ltd.) (inorganic compound for heat retention), 0.1 part by weight of 2,6-di-tert-butylhydroxytoluene of the foregoing formula (1) (as a heat stabilizer), 0.4 part by weight of the hindered amine compound of the foregoing formula (40) (HALS 944; trademark: Chimassorb°944-LD; manufactured by Ciba-Geigy) (as a weather resistance improving agent), 0.15 part by weight of a sodium hypophosphite solution (20% by weight sodium hypophosphite, 80% by weight diethylene glycol) and 0.2 part of stearamide (as a lubricant).

The resulting mixture was kneaded in a Banbury mixer at 150° C. for 5 minutes and then granulated using a pelletizer. The thus-obtained composition pellets were formed into a film at 180° C. on an inflation film-forming machine to give a film having a thickness of 75 $\mu$m. This film was subjected to the weathering test and water immersion test.

Separately, the same pellets as mentioned above were formed into a 1-mm-thick sheet at 180° C. using a press molding machine and this sheet was subjected to the heat stability test.

As shown in Table 1, good results were obtained.

EXAMPLE 2

A film and a sheet were produced in the same manner as in Example 1 except that low-density polyethylene (trademark: Sumikathene F208-0; manufactured by Sumitomo Chemical Company, Limited; MI=1.5 g/10 minutes) was used as the polyolefin resin.

The same tests as performed in Example 1 were performed with the film and sheet obtained. As shown in Table 1, good results were obtained.

EXAMPLE 3

A film and a sheet were produced in the same manner as in Example 1 except that the hindered amine compound of the foregoing formula (39) (HALS 622; trademark: Tinuvin 622-LD; manufactured by Ciba-Geigy) was used as the weather resistance improving agent.

The same tests as performed in Example 1 were performed with the film and sheet obtained. As shown in Table 1, good results were obtained.

EXAMPLE 4

A film was produced in the same manner as in Example 1 except that 1 part by weight of the ultraviolet absorber of the foregoing formula (42) (UVA 130; trademark: Sumisorb 130; manufactured by Sumitomo Chemical Company, Limited) was used as the weather resistance improving agent.

The film obtained was subjected to the water immersion test. As shown in Table 1, a good result was obtained.

COMPARATIVE EXAMPLE 1

A film and a sheet were produced in the same manner as in Example 1 except that the use of the sodium hypophosphite solution was omitted.

The same tests as performed in Example 1 were performed with the film and sheet obtained. As shown in Table 2, they were inferior in weather resistance and heat stability.

COMPARATIVE EXAMPLE 2

A film and a sheet were produced in the same manner as in Example 1 except that 0.03 part by weight of sodium hypophosphite powder was used in lieu of the sodium hypophosphite solution.

The same tests as performed in Example 1 were performed with the film and sheet obtained. As shown in Table 2, the film showed whitening in the water immersion test, revealing that it was inferior from the performance characteristics viewpoint.

COMPARATIVE EXAMPLE 3

A film and a sheet were produced in the same manner as in Example 2 except that the use of the sodium hypophosphite solution was omitted.

The same tests as performed in Example 1 were performed with the film and sheet obtained. As shown in Table 2, they were inferior in weather resistance and heat stability.

COMPARATIVE EXAMPLE 4

A film and a sheet were produced in the same manner as in Example 2 except that 0.03 part by weight of sodium hypophosphite powder was used in lieu of the sodium hypophosphite solution.

The same tests as performed in Example 1 were performed with the film and sheet obtained. As shown in Table 2, the film showed whitening in the water immersion test, revealing that it was inferior from the performance characteristics viewpoint.

COMPARATIVE EXAMPLE 5

A film and a sheet were produced in the same manner as in Example 3 except that the use of the sodium hypophosphite solution was omitted.

The same tests as performed in Example 1 were performed with the film and sheet obtained. As shown in Table 2, they were inferior in weather resistance and heat stability.

COMPARATIVE EXAMPLE 6

A film was produced in the same manner as in Example 4 except that 0.03 part by weight of sodium hypophosphite powder was used in lieu of the sodium hypophosphite solution.

The sheet was subjected to the water immersion test. As shown in Table 2, the film showed whitening in the water immersion test, revealing that it was inferior from the performance characteristics viewpoint.

In Tables 1 and 2, EVA stands for ethylene-vinyl acetate copolymer, and LDPE stands for low-density polyethylene.

TABLE 1

| | | Composition | | Performance characteristics | | |
|---|---|---|---|---|---|---|
| | Resin | Weather resistance improving agent (parts by weight) | Hypophosphite compound solution (parts by weight) | Water immersion test | Heat stability test (8 hours) | Weathering test (weathering half-life) (hours) |
| Example 1 | EVA | HALS944 (0.4) | Sodium hypophosphite solution (0.15) | A | A | 150 |
| Example 2 | LDPE | HALS944 (0.4) | Sodium hypophosphite solution (0.15) | A | A | 150 |
| Example 3 | EVA | HALS622 (0.4) | Sodium hypophosphite solution (0.15) | A | A | 130 |
| Example 4 | EVA | UVA130 (1.0) | Sodium hypophosphite solution (0.15) | A | — | — |

TABLE 2

| | Composition | | | Performance characteristics | | |
|---|---|---|---|---|---|---|
| | Resin | Weather resistance improving agent (parts by weight) | Hypophosphite compound solution (parts by weight) | Water immersion test | Heat stability test (8 hours) | Weathering test (weathering half-life) (hours) |
| Comparative Example 1 | EVA | HALS944 (0.4) | None | A | C | 70 |
| Comparative Example 2 | EVA | HALS944 (0.4) | Sodium hypophosphite powder (0.03) | C | B | 130 |
| Comparative Example 3 | LDPE | HALS944 (0.4) | None | A | C | 80 |
| Comparative Example 4 | LDPE | HALS944 (0.4) | Sodium hypophosphite powder (0.03) | C | B | 130 |
| Comparative Example 5 | EVA | HALS622 (0.4) | None | A | C | 60 |
| Comparative Example 6 | EVA | UVA130 (1.0) | Sodium hypophosphite powder (0.03) | C | — | — |

What is claimed is:

1. An agricultural film produced by forming into a film a composition comprising:
   (a) a polyolefin resin,
   (b) a dripping agent,
   (c) a heat stabilizer,
   (d) a weather resistance improving agent which comprises at least one hindered amine compound, and
   (e) a solution of a hypophosphite compound in an organic solvent.

2. An agricultural film as claimed in claim 1, wherein said polyolefin resin has a melt flow index of about 0.3 to 4 g/10 minutes.

3. An agricultural film as claimed in claim 1, wherein said polyolefin resin is a low-density polyethylene or an ethylene-α-olefin copolymer having a density of not more than 0.935 g/cm$^3$.

4. An agricultural film as claimed in claim 1, wherein said polyolefin resin is an ethylene-vinyl acetate copolymer having a vinyl acetate content of not more than 30% by weight.

5. An agricultural film as claimed in claim 1, wherein said dripping agent comprises at least one member selected from the group consisting of sorbitan fatty acid ester surfactants, glycerol fatty acid ester surfactants, polyalkylene glycol fatty acid ester surfactants, alkylphenol-alkylene oxide adducts, and organic acid esters of sorbitan-glycerol condensates.

6. An agricultural film as claimed in claim 1, wherein said dripping agent is used in an amount of about 0.5 to 5 parts by weight per 100 parts by weight of the polyolefin resin.

7. An agricultural film as claimed in claim 1, wherein said heat stabilizer comprises at least one member selected from the group consisting of hindered phenol compounds, sulfur compounds having one or more thiol or thioether bonds, and phosphite ester compounds.

8. An agricultural film as claimed in claim 1, wherein said heat stabilizer is used in an amount of about 0.01 to 1 part by weight per 100 parts by weight of the polyolefin resin.

9. An agricultural film as claimed in claim 1, wherein said weather resistance improving agent comprises at least one hindered amine compound which is a 2,2,6,6-tetraalkylpiperidine compound having a substituent in position 4 and optionally having a substituent alkyl group on the nitrogen atom, said compound having a molecular weight of 250 to 10,000.

10. An agricultural film as claimed in claim 1, wherein said weather resistance improving agent is used in an amount of about 0.01 to 3 parts by weight per 100 parts by weight of the polyolefin resin.

11. An agricultural film as claimed in claim 1, wherein said hypophosphite compound has the general formula $$X_a(H_2PO_2)_b \qquad (A)$$

wherein X is a metal ion, an ammonium ion or a quaternary phosphonium ion, a and b each is a natural number and a multiplied by c is equal to b, wherein c is the valence of the metal ion represented by X.

12. An agricultural film as claimed in claim 1, wherein said hypophosphite compound comprises at least one member selected from the group consisting of lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophospite, triethylammonium hypophosphite, tetraethylammonium hypophosphite, tetrabutylphosphonium hypophosphite and tetraphenylphosphonium hypophosphite.

13. An agricultural film as claimed in claim 1, wherein said hypophosphite compound is used in an amount of about 0.01 to 2 parts by weight per 100 parts by weight of the polyolefin resin.

14. An agricultural film as claimed in claim 1, wherein said organic solvent can dissolve said hypophosphite compound and has a boiling point not lower than the temperature at which said composition is processed into a film.

15. An agricultural film as claimed in claim 1, wherein said organic solvent comprises at least one member selected from the group consisting of ethylene glycol, diethylene glycol, polyethylene glycol with a molecular weight of about 150 to 50,000, propylene glycol, polypropylene glycol with a molecular weight of about 134 to 50,000, glycerol, diglycerol, hexaglycerol, trimethylolpropane, hexamethylenediamine and dimethyl sulfoxide.

16. An agricultural film as claimed in claim 1, wherein said solution contains said hypophosphite compound at a concentration not higher than the saturation concentration and is used in an amount of about 0.01 to 5 parts by weight per 100 parts by weight of the polyolefin resin.

17. An agricultural film as claimed in claim 1, wherein said composition further contains an inorganic compound, said inorganic compound being an oxide, hydroxide, carbonate, sulfate, phosphate, silicate, aluminate or aluminosilicate of a metal, or hydrotalcite, or a mixture of these, said metal being selected from the group consisting of lithium, sodium, potassium, magnesium, calcium, zinc, aluminum, silicon and titanium.

18. An agricultural film as claimed in claim 17, wherein said inorganic compound has an average particle size of about 0.5 to 10 μm and is used in an amount of up to 20 parts by weight per 100 parts by weight of the polyolefin resin.

19. An agricultural film as claimed in claim 1, which has a thickness of about 0.02 to 0.3 mm.

20. An agricultural film produced by forming into a film a composition comprising:
(a) a polyolefin resin having a melt flow index of about 0.3 to 4 g/10 minutes,
(b) a dripping agent which comprises at least one member selected from the group consisting of sorbitan fatty acid ester surfactants, glycerol fatty acid ester surfactants, polyalkylene glycol fatty acid ester surfactants, alkylphenol-alkylene oxide adducts, and organic acid esters of sorbitan-glycerol condensates,
(c) a heat stabilizer which comprises at least one member selected from the group consisting of hindered phenol compounds, sulfur compounds having one or more thiol or thioether bonds, and phosphite ester compounds,
(d) a weather resistance improving agent which comprises at least one hindered amine compound which is a 2,2,6,6-tetraalkylpiperidine compound having a substituent in position 4 and optionally having a substituent alkyl group on the nitrogen atom, said compound having a molecular weight of 250 to 10,000, and
(e) a solution of a hypophosphite compound in an organic solvent wherein said hypophosphite compound has the general formula $$X_a(H_2PO_2)_b \qquad (A)$$

wherein X is a metal ion, an ammonium ion or a quaternary phosphonium ion, a and b each is a natural number and a multiplied by c is equal to b, wherein c is the valence of the metal ion represented by X.

* * * * *